Jan. 27, 1970     J. A. WATKINS     3,492,615
PIVOTED STATOR ELECTROMAGNETIC INDICATOR
Filed Dec. 22, 1967     4 Sheets-Sheet 2
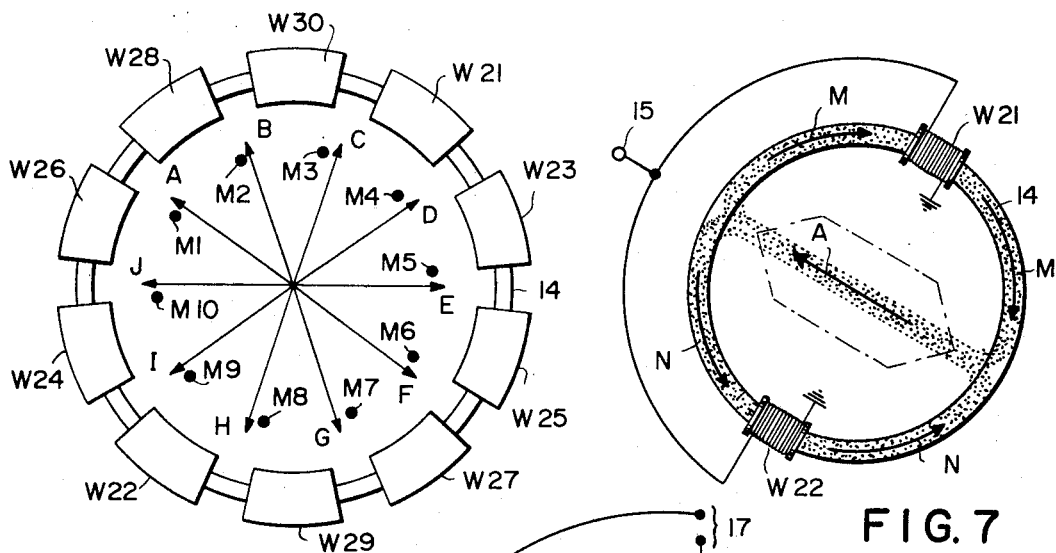
FIG. 6
PRIOR ART
FIG. 7
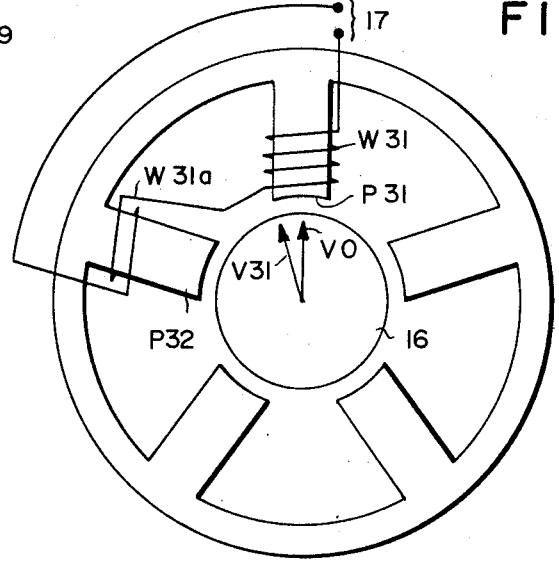
FIG. 8
PRIOR ART
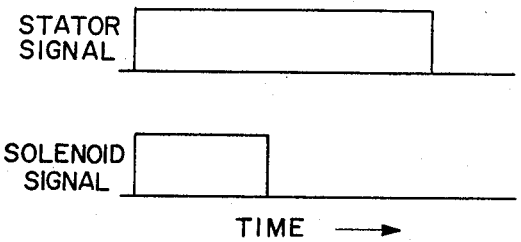
FIG. 12
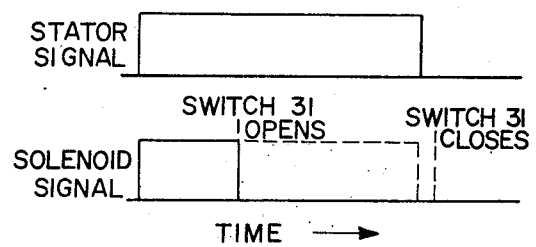
FIG. 13
INVENTOR.
JOHN A. WATKINS
BY
Louis Orenbuch
ATTORNEY

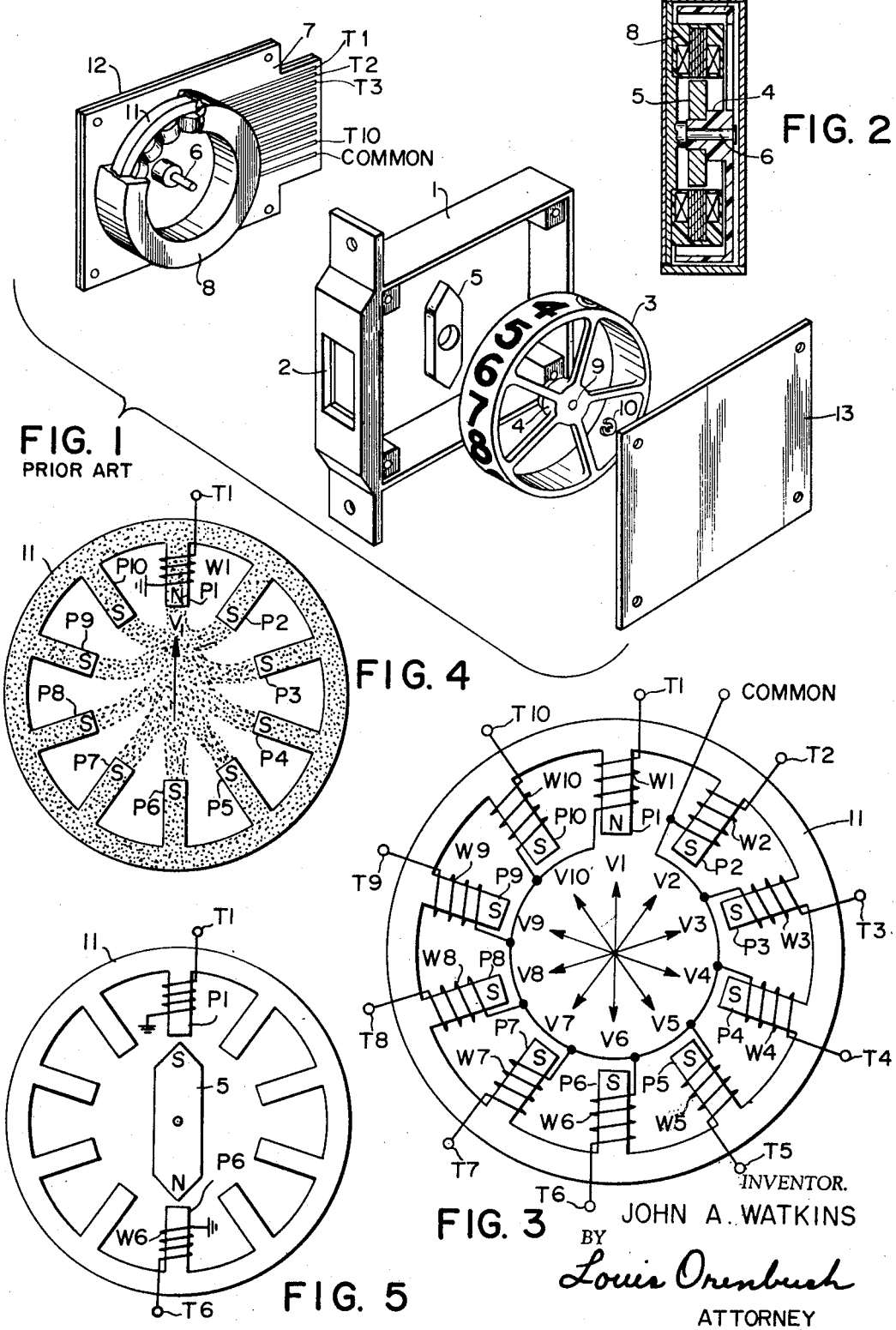

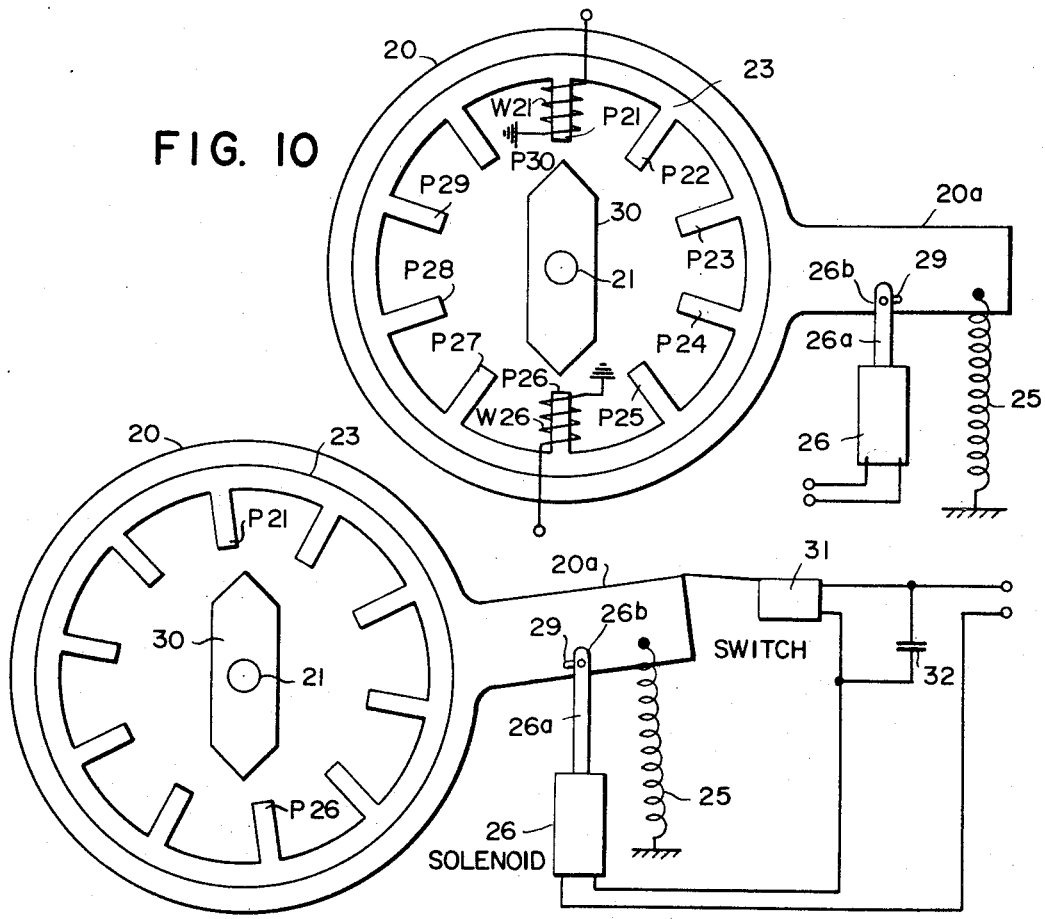
FIG. 10
FIG. 11
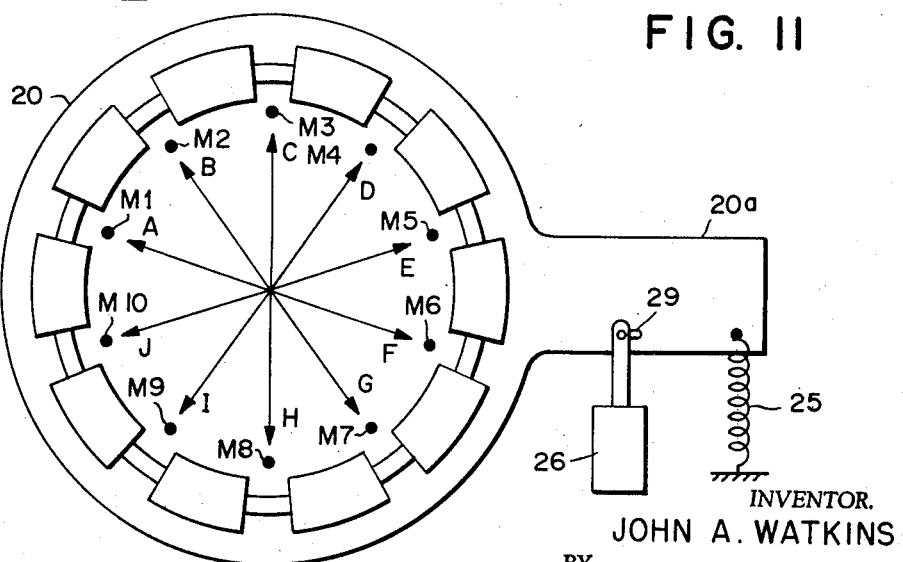
FIG. 14

United States Patent Office 3,492,615
Patented Jan. 27, 1970

3,492,615
PIVOTED STATOR ELECTROMAGNETIC INDICATOR
John A. Watkins, Cheshire, Conn., assignor, by mesne assignments, to United-Carr Incorporated, Boston, Mass., a corporation of Delaware
Filed Dec. 22, 1967, Ser. No. 692,838
Int. Cl. H01f 5/00, 7/18
U.S. Cl. 335—268      2 Claims

ABSTRACT OF THE DISCLOSURE

An indicator has a window in which can be displayed any of the symbols carried upon the drum of a rotor having an affixed permanent magnet. The stator of the indicator, when electrically energized, establishes a discretely oriented magnetic field which causes the permanent magnet to rotate into alignment with the oriented field. The stator is of the type which can establish 180° opposite magnetic fields in succession. To prevent the rotor from "hanging up" when successive 180° opposite fields occur, the stator is mounted to turn and a solenoid is arranged to turn the stator through a limited angle to insure the presence of a torque upon the rotor when the indicator is commanded to display a symbol.

SUMMARY OF THE INVENTION

Figure 9:
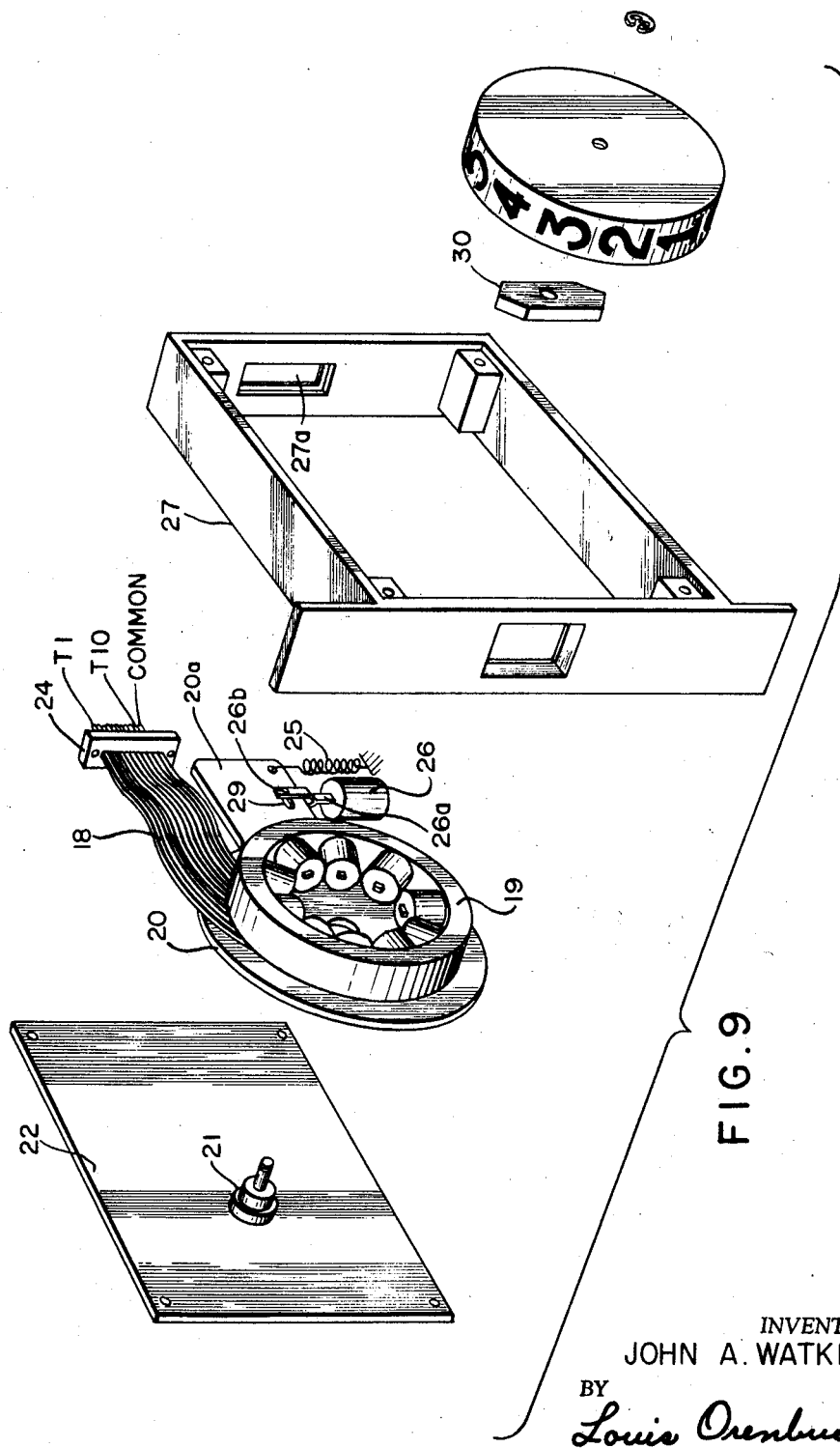

This invention relates in general to indicators of the type employing an electromagnetic stator to determine the orientation of a rotor upon which symbols are marked. In that type of indicator, any symbol on the rotor can be brought into view in a window of the indicator by appropriately energizing the windings of the electromagnetic stator. More particularly, the invention pertains to an improvement which insures the presence of a torque to turn the rotor whenever the indicator is commanded to display a different symbol.

THE PROBLEM

The conventional electromagnetic indicator employs a stator that is fixed in position and governs the position of a rotor which has a drum upon which symbols are marked. To display a selected symbol, the stator is electrically energized to establish a magnetic field of discrete orientation. The rotor has an affixed permanent magnet which causes the rotor to turn and align the permanent magnet with the discretely oriented magnetic field. For each symbol on the drum, the stator is able to establish a magnetic field of unique orientation. Thus, where the drum has ten symbols, the stator is able to establish any one of ten magnetic fields, each field being oriented in a different direction. To enable the symbols to be spaced at uniform intervals completely around the drum, it is necessary, where there are an even number of symbols, that the stator be able to establish magnetic fields that are oriented in 180° opposite directions. Where 180° opposite magnetic fields are established in succession by the stator, the permanent magnet, in order to come into alignment with the succeeding magnetic field, must turn through an 180° angle. The rotor, however, tends to remain in its initial position when successive 180° opposite fields occur because no turning moment is exerted on the permanent magnet by the last occurring field. The rotor therefore tends to "hang up" and if the rotor moves at all, its initial movement is sluggish.

DISCUSSION OF THE PRIOR ART

Solutions to the problem caused by the 180° opposite magnetic fields are disclosed in U.S. Patent 2,943,313 to Gordon et al. and in U.S. Patent 3,311,911 to Pursiano et al. The solutions propounded by those patents, essentially reside in permitting the permanent magnet to rotate into alignment with the oriented magnetic field established by the electrically energized stator and then causing the permanent magnet to move to an adjacent "offset" position when the stator becomes unenergized. For each symbol on the drum, the rotor has two positions; a position where it is aligned with the stator's magnetic field, and an "offset" position. The operation of indicators using those solutions is characterized by a "blink" of the symbol in the window.

THE INVENTION

The objective of the invention here disclosed is to insure the presence of a torque upon the rotor whenever the indicator is commanded to display a different symbol. Essentially, the invention is a different solution to the problem dealt with by the Gordon and Pursiano patents. The invention resides in mounting the stator so that it can turn relative to the rotor and employing an actuating device to turn the stator through a limited angle when the indicator is commanded to display a symbol.

THE DRAWINGS

The invention, both as to its construction and its manner of operation, can be better apprehended from the exposition which follows when it is considered in conjunction with the accompanying drawings in which:

FIG. 1 is an exploded view of an indicator of conventional construction employing a stator having radial poles, FIG. 2 is a view showing the assembled indicator of FIG. 1 in cross-section, FIG. 3 is a schematic representation showing the arrangement of windings on a stator having ten radial poles, FIG. 4 depicts the flux pattern of the magnetic field established by energizing a winding of the radial pole stator, FIG. 5 illustrates the aligment of the rotor's permanent magnet with the field vector of the electrically energized radial pole stator, FIG. 6 illustrates magnetizable elements employed with a toroidal stator to provide "offset" for the indicator's rotor, FIG. 7 depicts the magnetic field established by the electrically energized windings of a toroidal stator, FIG. 8 shows a stator employing a winding having two sections to establish a magnetic field whose vector is "offset" from an adjacent radial pole, FIG. 9 is an exploded view of the preferred embodiment of the invention, FIG. 10 depicts the initial position of the stator employed in the invention, FIG. 11 shows the torque producing position of the stator, FIG. 12 is a timing diagram showing the relation of the electrical signals applied to the stator and the solenoid, FIG. 13 is a timing diagram illustrating the effect of switch 31 in interrupting the solenoid signal, and FIG. 14 depicts the preferred arrangement disposition of the magnetic detent elements when a toroidal type stator is employed in the invention.

THE EXPOSITION

FIG. 1 depicts an indicator, of conventional construction, employing a housing 1 having a front panel containing a window 2 for displaying symbols carried upon the periphery of a drum 3. The drum has a hub 4 to which a permanent magnet 5 is secured, as shown in the sectional view of FIG. 2. The drum and permanent magnet comprise a rotor that is mounted to turn as a unit about a shaft 6. The shaft is secured to a board 7 and extends through the center of an annular stator 8. The hub 4 has a central bore 9 which permits the rotor to be mounted on the shaft. To retain the rotor so that it cannot slip off the shaft, a groove is provided near the shaft's end and the groove is engaged by a C-shaped lock member 10.

The stator 8 is depicted in FIG. 3 and has an annular ferromagnetic core 11 from which ten poles P1, P2 . . . P10 protrude radially inward. The poles are identical and are arranged symmetrically around the annulus. Each of the ten poles is surrounded by its own winding, symbolically indicated in FIG. 3 by the windings W1, W2 . . . W10, and each winding can be separately energized by applying an electrical signal to it. Conventionally, each winding has one end connected to a COMMON line and the electrical signals applied to the windings are all of the same polarity with respect to the COMMON potential.

The stator 8 has its core 11 and windings embedded in a matrix of a synthetic resin (viz, a "plastic" substance). In FIG. 1 a portion of the matrix has been broken away to show the ferromagnetic core and some of its windings. The synthetic resin holds the windings fixed upon the radial poles and helps to dissipate the heat that is generated by the current flow in the windings. In FIG. 3, the stator, to more clearly delineate its construction, is shown without its plastic embedment.

The stator is, preferably, secured to the board 7 which has electrical conductors to which windings W1, W2 . . . W10 are connected. By applying an electrical signal to one of the terminals T1 . . . T2 . . . T10 and the COMMON terminal, a selected one of the windings can be electrically energized.

The stator and the rotor fit within the housing 1, as indicated in the sectional view of FIG. 2. In the assembled device, the drum 3 surrounds the annular stator 8 and the permanent magnet of the rotor is in the same plane as the radial poles of the stator.

The sides of the housing 1 are closed by end plates 12 and 13 which act as magnetic shields to prevent extraneous magnetic fields from interfering with the operation of the indicator. At the interior corners of the housing, posts are provided for receiving screws or other fastening means which hold the end plates securely to the housing. In the assembled device, the printed circuit board protrudes from the rear of the housing to permit access to terminals T1, T2 . . . T10 and COMMON.

Assuming that winding W1 of the stator shown in FIG. 4 is electrically energized to cause pole P1 to be a North magnetic pole, all the other poles become South magnetic poles. The flux pattern of the magnetic field established by the energized winding is indicated by the stippling in FIG. 4. The magnetic field is represented in that figure by the vector V1 whose direction is toward the North magnetic pole P1 and whose length is a measure of the magnetic field intensity. Permanent magnet 5 which is within the magnetic field, rotates into alignment with the vector V1 and assumes the position indicated in FIG. 5 where the South pole of the permanent magnet is adjacent to pole P1. The permanent magnet 5 has salient North and South magnetic poles and when that magnet is aligned, as indicated in FIG. 5, with the vector V1, one of the symbols on the drum is positioned in the window 2 of the housing.

By separately energizing each of the windings on the stator, ten discretely oriented magnetic field vectors V1, V2 . . . V10 can be established as indicated in FIG. 3 and thereby any of ten symbols on the drum can be brought into display position in the window of the housing.

Preferably, each symbol on the drum is of such size that it completely fills the window so that only one symbol can be in registration with the window at any time. For the purpose of exposition, the symbols are assumed to be the Arabic numerals 0, 1, 2 . . . 9.

Assuming the permanent magnet rotates into alignment with poles P1 and P6, as indicated in FIG. 5, and that the electrical excitation of winding W1 ends, the magnetic field established by the stator collapses. The rotor, however, retains its aligned position because of the attractive force between the poles of the permanent magnet 5 and the adjacent poles P1 and P6 of the stator. The indicator, in essence, has a "memory" because the rotor remains in position after the input signal to the stator has ended and retains that position until the rotor is commanded to take another position by energizing a different winding on the stator.

Assuming the permanent magnet is aligned with poles P1 and P6, as depicted in FIG. 5, and that the winding W6 is then electrically energized, the rotor must turn through 180° to align itself with the vector V6. There is, however, no turning moment present to cause the rotor to turn because the magnetic field established by the stator is precisely 180° opposite to the field of the permanent magnet. The resultant force acting on the permanent magnet is therefore directed through the rotor's axis of rotation. The rotor, consequently, tends to remain in position (viz., tends to "hang up") and its initial turning motion, if it turns at all, is sluggish. Where consistently rapid operation of the conventional indicator is desired, it is necessary to avoid having the rotor turn from one position to an immediately following position that is 180° away.

U.S. Patent 2,943,313, to Gordon et al., discloses an invention which solves the problem caused by an 180° reversal of the rotor's position. The Gordon indicator employs a stator of the toroidal type rather than the radial pole type. In a toroidal stator the windings W21, W22 . . . W30 are mounted, as indicated in FIG. 6, to encircle the ferromagnetic core 14. The windings are arranged to be electrically energized in pairs in order to force the flux of the magnetic field to diametrically bridge the annulus. Consider for example the two windings W21 and W22 shown in FIG. 7. The windings are illustrated as being connected in parallel, but they may be connected in series and yet attain the same result. The windings, whether connected in series or in parallel, are arranged so that when electrically energized by a voltage applied at terminal 15, the current flow in winding W21 established a magnetic flux in core 14 whose direction is counter to the direction of magnetic flux established by the current flow in winding W22. Assuming that winding W21 causes its magnetic flux to flow clockwise as indicated by the M arrows in FIG. 7, then the magnetic flux established by winding W22 flows in the counterclockwise direction as indicated by the N arrows. Because of the direction of the fields established by the two windings, the magnetic flux is forced out of the core as depicted by the stippling in FIG. 7 and extends diametrically across the annular core. The external magnetic field can be represented by the vector A whose direction is the direction of the external field. In the absence of any other external magnetic field, the permanent magnet of the rotor, indicated in phantom in FIG. 7 is constrained to rotate into alignment with the A vector. Reversing the direction of the current flow in windings W21 and W22 by applying a signal of opposite electrical polarity at terminal 15, causes the stator to establish a magnetic field whose vector is 180° opposite to vector A.

In accordance with Gordon's teaching, magnetizable elements M1, M2 . . . M10 are, as shown in FIG. 6, offset from the field vectors A, B . . . J. The magnetizable elements may simply be bars of soft iron mounted in slots in a ring of nonmagnetic material. When a pair of windings on the stator are electrically energized, the permanent magnet aligns itself with the magnetic field vector. After the windings become electrically deenergized, the permanent magnet moves to an "offset" position because of the attraction exerted by the salient poles of the magnet upon the adjacent magnetizable elements. If the windings are then energized by a reverse polarity electrical signal, a turning force is immediately present to cause the rotor to turn to its new position.

An indicator employing the Gordon invention is characterized by a "blink" in its operation. The blink is caused by the permanent magnet of the rotor first aligning itself with the magnetic field established by the electrically energized stator and then moving to an "offset" position when the stator becomes electrically deenergized. When the permanent magnet is aligned with the magnetic field of the electrically energized stator, the symbol on the rotor's drum is not centered in the indicator's window. The "blink" occurs when the permanent magnet moves to its "offset" position and centers the symbol in the window.

The Gordon invention may be employed in an indicator utilizing a radial pole stator. The Gordon invention requires that the magnetizable elements M1, M2 . . . M10 be interposed between the stator and the rotor's permanent magnet 5. For Gordon's magnetizable elements to be effective in drawing the rotor to an "offset" position when used with a radial pole stator, the attractive force between the salient poles of the permanent magnet and the adjacent elements must be greater than the force of attraction between the permanent magnet's salient poles and the adjacent radial poles of the stator. Thus Gordon's invention requires that the magnetizable elements M1, M2 . . . M10 be interposed between the stator and the rotor's permanent magnet and that the salient poles of the permanent magnet not approach the radial poles too closely. Because of those requirements, a radial pole indicator employing Gordon's invention cannot be made as compact as the conventional radial pole indicator.

U.S. Patent 3,311,911 to Pursiano et al. offers a different solution to the problem dealt with in the Gordon patent. In the Pursiano et al. patent, each winding has a portion wound on the adjacent radial poles. For example, in FIG. 8, the winding W31 on radial pole P31 has a section W31$_a$ on adjacent radial pole P32. When that winding is electrically energized by a D.C. signal applied at terminals 17, the magnetic field established by the stator has the direction represented by the vector V31 and the permanent magnet 16 of the rotor aligns itself with that vector. Upon cessation of the electrical energization of winding W31, the stator's magnetic field collapses and the permanent magnet 16 moves to the position indicated by vector V$_0$ where the magnet is aligned with radial pole P31. An indicator employing the Pursiano et al. invention is, therefore, also characterized in operation by a "blink" of the displayed symbol.

Although the Pursiano et al. structure has only five radial poles, the stator can establish ten discretely oriented magnetic field vectors by employing a reversal of the polarity of the D.C. signal applied to the stator winding. For example, a reversal of the polarity of the D.C. signal applied at terminals 17 causes the stator to establish a magnetic field whose direction is 180° opposite to the direction of vector V31. However, as the rotor was previously aligned with the V$_0$ vector, a turning force is immediately present to cause the rotor to turn into alignment with the new magnetic field vector.

The invention here disclosed departs from the "prior art" represented by the Gordon and Pursiano et al. patents by mounting the stator to turn and employing an acuating device, such as a solenoid, to cause the stator to rotate relative to the permanent magnet of the rotor upon electrical energization of a stator winding. As depicted in FIGS. 9 and 10, the stator 19 is fastened to a plate 20 which has a central aperture for receiving the shaft 21 which is secured to end plate 22. The stator 19 is similar to the FIG. 3 structure and has an annular ferromagnetic core 23 from which poles P21, P22 . . . P30 extend radially inwardly. Each of the poles is surrounded by a winding W21, W22 . . . W30 and the windings are arranged to be separately energizable by an electrical signal. To provide external electrical connections to the windings, each of the windings is connected by flexible wiring 18 to terminals T1, T2 . . . T10 and the COMMON terminal on the connector plug 24. Any one of the windings on the stator can be separately electrically energized by applying an electrical signal between the COMMON terminal and the appropriate one of terminals T1, T2 . . . T10. The housing 27 has an aperture 27$a$ which accommodates the plug 24 and permits access to its terminals.

The plate 20 is journalled on shaft 21 and is normally held in a "rest" position by a spring 25 which is secured to an extension 21$a$ of the plate and has its other end anchored in the housing 27. A solenoid 26 is secured within the housing 27. The armature 26$a$ of the solenoid has a bifurcated end carrying a pin 26$b$ which can ride along the slot 29 in plate 20. Upon energization of the solenoid 26 by an electrical signal, the armature of the solenoid extends and forces the stator to pivot upon the shaft 21.

Assuming that the initial position of the rotor is that shown in FIG. 10 where the permanent magnet 30 is aligned with poles P21 and P26 due to the preceding energization of winding W21, and assuming that the solenoid is then electrically energized at the same time that an electrical signal is applied to stator winding W26, the extension of the solenoid's armature causes the plate 20 to pivot about shaft 21 so that the permanent magnet 30 becomes disaligned with poles P21 and P26, as indicated in FIG. 11, and a turning moment is immediately present to cause the rotor to turn. There is, therefore, no tendency for the rotor to "hang up" when diametrically opposite windings of the stator are energized in succession.

Upon cessation of an electrical signal to the solenoid, spring 25 immediately pulls the plate 20 back to its original "rest" position. To avoid having the indicator "blink," the signal to the solenoid is discontinued, as indicated in FIG. 12, while the winding of the stator is still energized by its signal. The plate 20 returns to its "rest" position at the time when the stator is still electrically energized. The permanent magnet 30 then aligns itself with the magnetic field established by the energized stator and when the stator becomes electrically unenergized, the magnet remains in its aligned position because of the attractive force of the adjacent radial poles.

The amount of rotation of the plate 20 caused by the solenoid is not critical but should be great enough (preferably about 5°) so that the permanent magnet can respond quickly to any magnetic field that is established by energization of the stator. The initial turning moment exerted upon the permanent magnet depends upon the angle between the vector representing the magnetic field established by the energized stator and the vector representing the internal magnetic field of the permanent magnet. The rotor, if it is mounted in very fine bearings, has a tendency to follow the turning motion of the stator. However, the inertia of the rotor causes the magnet to lag behind the stator and that lag is analogous to "slip" in an electric motor. The greater the "slip," the greater is the initial turning moment exerted upon the permanent magnet by the field of the energized stator. Thus, the invention obviates the necessity for the low friction bearings that are usually required in indicators having "offset" for the rotor.

To insure the prompt return of the plate 20 to its "rest" position after it has turned through the required angle, the signal to the solenoid's winding can be applied, as shown in FIG. 11, through a switch 31 which is fixed to the housing 27 and is arranged to open when the plate 20 reaches its maximum angle of travel and interrupt the signal to the solenoid. A capacitor 32 is connected across the switch to absorb the surge caused by the sudden collapse of the solenoid's magnetic field when the switch opens. The switch 31 is preferably of the type whose contacts open quickly and close slowly. Where, as depicted in FIG. 13, the signals to the solenoid and the winding of the stator are contemporaneous and of the same duration (viz., when the signals exist and end together), the slow closing switch insures that the signals have terminated before the contacts of the switch are again closed. The switch 31 need not be employed where the signal to the solenoid is contemporaneous with but of shorter duration than the signal to the stator's winding. The signal to the stator's winding must, in any case, persist for a time sufficient to permit the permanent magnet to rotate into alignment with the magnetic field established by the stator.

A toroidal stator such as is employed in the previously described Gordon indicator can be mounted on plate 20 in lieu of the radial pole stator 19. Where a toroidal stator is so employed, the magnetic detent elements M1, M2 . . . M10 can be disposed in line with the magnetic field vectors A, B . . . J as indicated in FIG. 14. The in line position of the magnetic detent elements permits the "blink" that is characteristic of the Gordon indicator to be eliminated.

Because the invention can be embodied in varied structures, it is not intended that the invention be limited to the forms here illustrated or described. Rather, it is intended that the invention be delimited by the appended claims and include those structures that do not fairly depart from the essence of the invention.

What is claimed is:
1. In an electromagnetic device of the type utilizing:
   a stator having a ferromagnetic core, the stator being electrically energizable to selectively establish any one of a plurality of discretely oriented magnetic fields, at least two of the magnetic fields being 180° opposite in direction, the stator responding to a command electrical signal by establishing one of the discretely oriented magnetic fields, and
   a rotor having a magnet, the magnet being surrounded by the core, the rotor being mounted to permit the magnet to rotate into alignment with the discretely oriented magnetic field established by the stator,
the improvement for insuring the application of a turning force upon the magnet when 180° opposite magnetic fields are established in succession by the stator, the improvement comprising,
   means mounting the stator and the rotor to turn about a common axis,
   actuating means responsive to a signal immediately preceding or substantially concurrent with the command signal for causing the stator to rotate away from a rest position and turn relative to the rotor's magnet, and
   means for returning the stator to its rest position upon deactivation of the actuating means.
2. The improvement according to claim 1, wherein the electromagnetic device includes a shaft which supports both the rotor and the stator for rotation, and the actuating means is an electrical solenoid.

References Cited

UNITED STATES PATENTS 1,950,754  3/1934  Scofield _____ 310—152 XR
3,412,393  11/1968  Watkins.

BERNARD A. GILHEANY, Primary Examiner

D. M. MORGAN, Assistant Examiner

U.S. Cl. X.R.

310—49; 335—272; 340—378